United States Patent
Al-Harbi et al.

(10) Patent No.: US 12,467,547 B2
(45) Date of Patent: Nov. 11, 2025

(54) SWING CHECK VALVE

(71) Applicant: Saudi Arabian Oil Company, Dhahran (SA)

(72) Inventors: Mousa R. Al-Harbi, Dammam (SA); Bader M. Al-Jarallah, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 64 days.

(21) Appl. No.: 18/483,168

(22) Filed: Oct. 9, 2023

(65) Prior Publication Data

US 2025/0116340 A1   Apr. 10, 2025

(51) Int. Cl.
*F16K 15/03* (2006.01)
(52) U.S. Cl.
CPC .................................... *F16K 15/03* (2013.01)
(58) Field of Classification Search
CPC ....... F16K 15/03; F16K 15/033; F16K 15/034
See application file for complete search history.

(56) References Cited

U.S. PATENT DOCUMENTS

| | | | | |
|---|---|---|---|---|
| 2,578,590 A | * | 12/1951 | Perrault | F16K 27/0232 137/493.5 |
| 2,717,001 A | * | 9/1955 | Perrault | F16K 47/00 251/210 |
| 3,870,071 A | * | 3/1975 | Graham | F16K 15/03 251/177 |
| 4,230,150 A | * | 10/1980 | Scaramucci | F16K 15/03 137/527 |
| 5,031,659 A | * | 7/1991 | Gonzales | F16K 15/03 137/527.6 |
| 11,174,966 B1 | | 11/2021 | Bahrami et al. | |

FOREIGN PATENT DOCUMENTS

| | | |
|---|---|---|
| CN | 101886711 | 11/2011 |
| CN | 211145470 | 7/2020 |
| KR | 101895477 | 9/2018 |

OTHER PUBLICATIONS

Dallstream et al., "Swing Check Valve Design Criteria and CFD Validation," Proceedings of ICONE14 14th International Conference on Nuclear Engineering, Jul. 17-20, 2006, Miami, Florida, 9 pages.

(Continued)

*Primary Examiner* — Kevin F Murphy
(74) *Attorney, Agent, or Firm* — Fish & Richardson P.C.

(57) ABSTRACT

A swing check valve includes a valve body that defines a fluid flow path from a fluid inlet to a fluid outlet; a flapper coupled to the valve body and moveable between a first position to allow fluid flow in a primary flow direction through the fluid flow path and a second position to impede fluid flow in a secondary flow direction through the fluid flow path; a seat coupled to or integral with the valve body within the fluid flow path such that the flapper is apart from a face of the seat in the first position and abuts the face of the seat in the second position, the seat including a groove formed in the face; and a dampening ring positioned within the groove and including an interface aligned with the face of the seat such that the flapper abuts the interface in the second position.

22 Claims, 6 Drawing Sheets

(56) References Cited

OTHER PUBLICATIONS

Himr et al., "Experimental investigation of the check valve behaviour when the flow is reversing," The European Physical Journal Conferences, Jan. 2017, 143(02036):1-6, 6 pages.

Kalsi et al., "Prediction of Check Valve Performance and Degradation in Nuclear Power Plant Systems," Final Report, Prepared for U.S. Nuclear Regulatory Commission, Sep. 1987-Apr. 1988, 79 pages.

Technimex.com [online], "Check valve with lever and weight plus hydraulic adjustable damper, type 4010HD," Available on or before Dec. 22, 2016, via Internet Archive: Wayback Machine URL <https://web.archive.org/web/20161222104400/https://www.technimex.com/en/products/non-return-valves/check-valve-hydraulic-lever-counterweight/>, retrieved on May 15, 2024, URL <https://www.technimex.com/en/products/non-return-valves/check-valve-hydraulic-lever-counterweight/>, 3 pages.

Valvemagazine.com [online], "The Misunderstood Check Valve," Dec. 27, 2022, retrieved on May 15, 2024, retrieved from URL <https://www.valvemagazine.com/articles/the-misunderstood-check-valve>, 7 pages.

Win-valve.com [online], "Swing Check Valve with Damper," Upon information and belief, available no later than Jul. 12, 2023, retrieved on May 15, 2024, retrieved from URL <https://www.win-valve.com/Cast-Steel-Check-Valve/544.html>, 3 pages.

\* cited by examiner

SWING CHECK VALVE

TECHNICAL FIELD

This disclosure relates to a swing check valve.

BACKGROUND

Swing check valves can be preferred to other types of check valves, such as spring assisted check valves for arduous process fluid applications based on the straightforward design. Further, as swing check valves use a freely rotatable flapper or disk, they are often suitable for unclean process fluid flows. However, in applications where the flow of the process fluid can quickly reverse a direction of flow, the process fluid back flow can drive a fluid velocity to a maximum value, which can create an undesirable impact on the valve seat. This can lead to damage of the valve or components of the valve, such as the seat or flapper.

SUMMARY

In an example implementation, a swing check valve includes a valve body that defines a fluid flow path from a fluid inlet at a first end of the valve body to a fluid outlet at a second end of the valve body opposite the first end; a flapper coupled to the valve body and moveable between a first position to allow fluid flow in a primary flow direction from the fluid inlet to the fluid outlet through the fluid flow path and a second position to impede or prevent fluid flow in a secondary flow direction from the fluid outlet to the fluid inlet through the fluid flow path; a seat coupled to or integral with the valve body within the fluid flow path such that the flapper is apart from a face of the seat in the first position and abuts the face of the seat in the second position, the seat including a groove formed in the face; and a dampening ring positioned at least partially within the groove and including an interface aligned with the face of the seat such that the flapper abuts the interface in the second position.

In an aspect combinable with the example implementation, the dampening ring includes a body formed as a ring and including the interface; a plurality of biasing members circumferentially positioned about and at least partially within the body and adjacent an end wall of the groove; and a seal positioned on or at least partially within the body and adjacent a side wall of the groove.

In another aspect combinable with any of the previous aspects, the plurality of biasing members are a plurality of coil springs, a plurality of helical compression springs, or a plurality of Belleville washers.

In another aspect combinable with any of the previous aspects, the interface includes a ring of polymer positioned on or at least partially within the body opposite the plurality of biasing members.

In another aspect combinable with any of the previous aspects, the polymer ring includes polytetrafluoroethylene.

In another aspect combinable with any of the previous aspects, the body is formed of a polymer, and the interface includes an end face of the body opposite the plurality of biasing members.

In another aspect combinable with any of the previous aspects, the body of the dampening ring includes a shoulder that faces away from the plurality of biasing members.

In another aspect combinable with any of the previous aspects, the face of the seat includes a removable face secured to the valve body adjacent the shoulder to at least partially secure the dampening ring within the groove.

In another aspect combinable with any of the previous aspects, the groove includes a plurality of slots formed in the end wall of the groove, each slot sized to receive at least a portion of one of the plurality of biasing members.

In another aspect combinable with any of the previous aspects, the seal includes a flexible seal configured to deform at least partially into a space between the body and the side wall of the groove based on a pressure of the fluid flow in the secondary flow direction.

In another example implementation, a method of operating a swing check valve includes flowing a fluid to a fluid inlet of a valve body of a swing check valve; flowing the fluid through a fluid flow path of the valve body by moving, with the flow of the fluid, a flapper coupled to the valve body away from a face of a seat coupled to or integral with the valve body, the seat including a groove formed in the face, the swing check valve including a dampening ring positioned in the groove and including an interface; flowing the fluid to a fluid outlet of the valve body opposite the fluid inlet; receiving a flow of the fluid from the fluid outlet toward the fluid inlet; and based on the flow of the fluid from the fluid outlet toward the fluid inlet, moving the flapper to abut the face of the seat and the interface to impede or prevent the flow of the fluid through the fluid flow path to the fluid inlet.

An aspect combinable with the example implementation includes absorbing at least a portion of energy generated when the flapper abuts the interface, through a body of the dampening ring, with a plurality of biasing members circumferentially positioned about and at least partially within the body and adjacent an end wall of the groove.

In another aspect combinable with any of the previous aspects, the plurality of biasing members are a plurality of coil springs, a plurality of helical compression springs, or a plurality of Belleville washers.

Another aspect combinable with any of the previous aspects includes absorbing the portion of energy generated when the flapper abuts the interface with the interface that includes a ring of polymer positioned on or at least partially within the body opposite the plurality of biasing members.

In another aspect combinable with any of the previous aspects, the polymer ring includes polytetrafluoroethylene.

Another aspect combinable with any of the previous aspects includes absorbing the portion of energy generated when the flapper abuts the interface that includes an end face of the body opposite the plurality of biasing members.

In another aspect combinable with any of the previous aspects, the body is formed of a polymer.

In another aspect combinable with any of the previous aspects, the body of the dampening ring includes a shoulder that faces away from the plurality of biasing members.

In another aspect combinable with any of the previous aspects, the dampening ring is at least partially secured within the groove with a removable portion of the face that is secured to the valve body adjacent the shoulder.

Another aspect combinable with any of the previous aspects includes absorbing at least a portion of energy generated when the flapper abuts the interface, through the plurality of biasing members, with each biasing member at least partially extending from the dampening ring into a respective slot formed in the end wall of the groove.

Another aspect combinable with any of the previous aspects includes blocking a portion of the flow of the fluid from the fluid outlet toward the fluid inlet that circulates within a space between the body and the side wall of the groove with a seal positioned on or at least partially within the body.

Another aspect combinable with any of the previous aspects includes at least partially deforming the seal into the space between the body and the side wall of the groove based on a pressure of the portion of the flow of the fluid from the fluid outlet toward the fluid inlet.

Implementations of a swing check valve according to the present disclosure may include one or more of the following features. For example, implementations according to the present disclosure can dampen damaging forces associated with the closure of the valve through high velocity reverse flow. As another example, implementations according to the present disclosure can prevent or help prevent reverse flow leaks through the valve in cases where the reverse flow is at a relative low pressure. As another example, implementations according to the present disclosure can be implemented as replacement components on an existing swing check valve during a renewal or overhaul to extend a life of the valve seat.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of a swing check valve that controls a flow of a process fluid, such as a hydrocarbon or other fluid (for example, liquid or mixed-phase fluid) in a primary direction of flow, while impeding or preventing a flow of the process fluid in a secondary direction of flow that is opposite the primary direction. In doing so, the example implementations of a swing check valve according to the present disclosure can minimize an amount or degree of force to which a flapper or disk of the valve contacts a seat of the valve when the flow of the process fluid rapidly changes from the primary direction to the second directions. Such a force can occur based on a relatively high velocity of the flow in the secondary direction (in other words, a reverse direction), which results in a higher or increased pressure surge to urge the flapper against the seat. As the reverse velocity increases, the pressure surge increases as does the resulting impacting force generated on closure of the swing check valve.

Furthermore, the example implementations of a swing check valve according to the present disclosure can prevent or reduce a leakage of the process fluid through the valve in the secondary direction even when the flow of the process fluid in the secondary direction is at a relative low pressure (for example, at a pressure that does not maintain the flapper or disk at a fluid-tight contact against the seat.

Example implementations of a swing check valve according to the present disclosure include a dampening seat ring (or "dampening ring") to a seat of the valve to provide a one or more dampening effects to counter a high pressure or force impact between the flapper (or disk) and the seat during a relatively high velocity flow of the process fluid in the secondary direction (in other words, a direction that urges the flapper against the seat). In some aspects, the dampening ring can include one or more dampening features, such as one or more biasing members (for example, springs or Belleville washers), an impact interface comprised of a material to dampen the impact, or a combination of such dampening features.

In example implementations, the dampening ring according to the present disclosure can include a seal that blocks a fluid pathway that extends between the flapper (or disk) and the seat (when the flapper is seated on the seat with the swing check valve in a closed position). The fluid pathway can leak fluid, even when the valve is in a closed position, due to a relatively low pressure flow of the process fluid in the secondary direction, absent the seal of the dampening ring.

Figure 1:
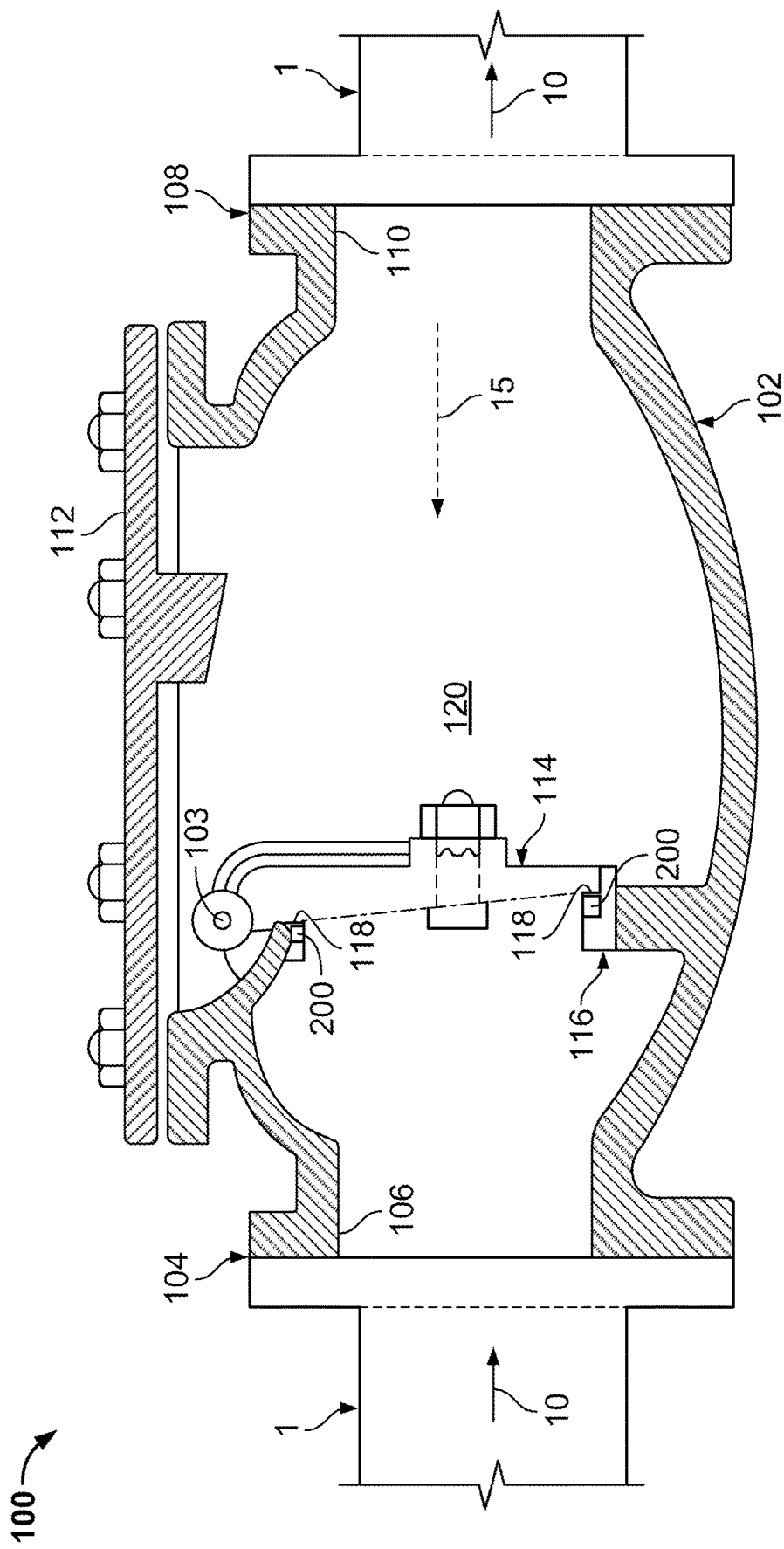
FIG. 1 is a cross-section view of an example implementation of a swing check valve that includes a dampening ring according to the present disclosure.

FIG. 1 is a cross-section view of an example implementation of a swing check valve 100 that includes a dampening ring according to the present disclosure. As shown in this example, the swing check valve 100 includes a valve body 102 that defines a flow path 120. The flow path 120 provides a path or volume for a primary fluid flow 10 to circulate, for example, within a piping network 1, in which the swing check valve 100 is fluidly coupled. As shown, the primary fluid flow 10 enters the swing check valve 100 at a fluid inlet 106 at a first end 104 of the swing check valve 100. A cover 112 (or bonnet cover 112) attaches (for example, with bolts or other fasteners) to the valve body 102 to enclose the fluid path 120 within the swing check valve 100.

Primary fluid flow 10 circulates through the flow path 120 and, based on a fluid pressure and/or flow rate of the primary fluid flow 10, moves a flapper 114 (or disk 114) away from a seat 116 coupled (attached to or integrally with) the valve body 102 to place the swing check valve 100 into an open position. Movement of the flapper 114 away from the seat 116 occurs by rotation of the flapper 114 about a hinge (or pivot) 103 that couples the flapper 114 with the valve body 102. When the flapper 114 is in contact with a face 118 of the seat 116, the swing check valve 100 is considered to be in a closed position such that the primary fluid flow 10 does not circulate (or does not significantly circulate beyond undesired leaks) through the valve body 102 from the fluid inlet 106 to the fluid outlet 110.

Closure of the swing check valve 100 can occur based on a low or insignificant flow and/or pressure of the primary fluid flow 10 (in a direction as shown in FIG. 1) or based on a high or significant flow and/or pressure of a secondary fluid flow 15 that circulates oppositely from the primary fluid flow 10 (in other words, in a direction from the fluid outlet 110 toward the fluid inlet 106). Upon the high or significant velocity or pressure of the secondary fluid flow 15, the flapper 114 is urged against the face 118 of the seat 116 to place the swing check valve 100 in a closed position.

As shown in FIG. 1, a dampening ring 200 is installed into the seat 116. As explained in more detail herein, the dampening ring 200 can be installed in (for example, fastened within or secured within) a groove formed on the face 118 of the seat 116. The groove can be circular to receive, in this example, a circular dampening ring 200. The dampening ring 200, as further explained, operates during closure of the swing check valve 100 (by the flapper 114 pivoting about the hinge 103 to contact the seat 116) to minimize or dampen the contacting force between the flapper 114 and the seat 115.

Figure 2:
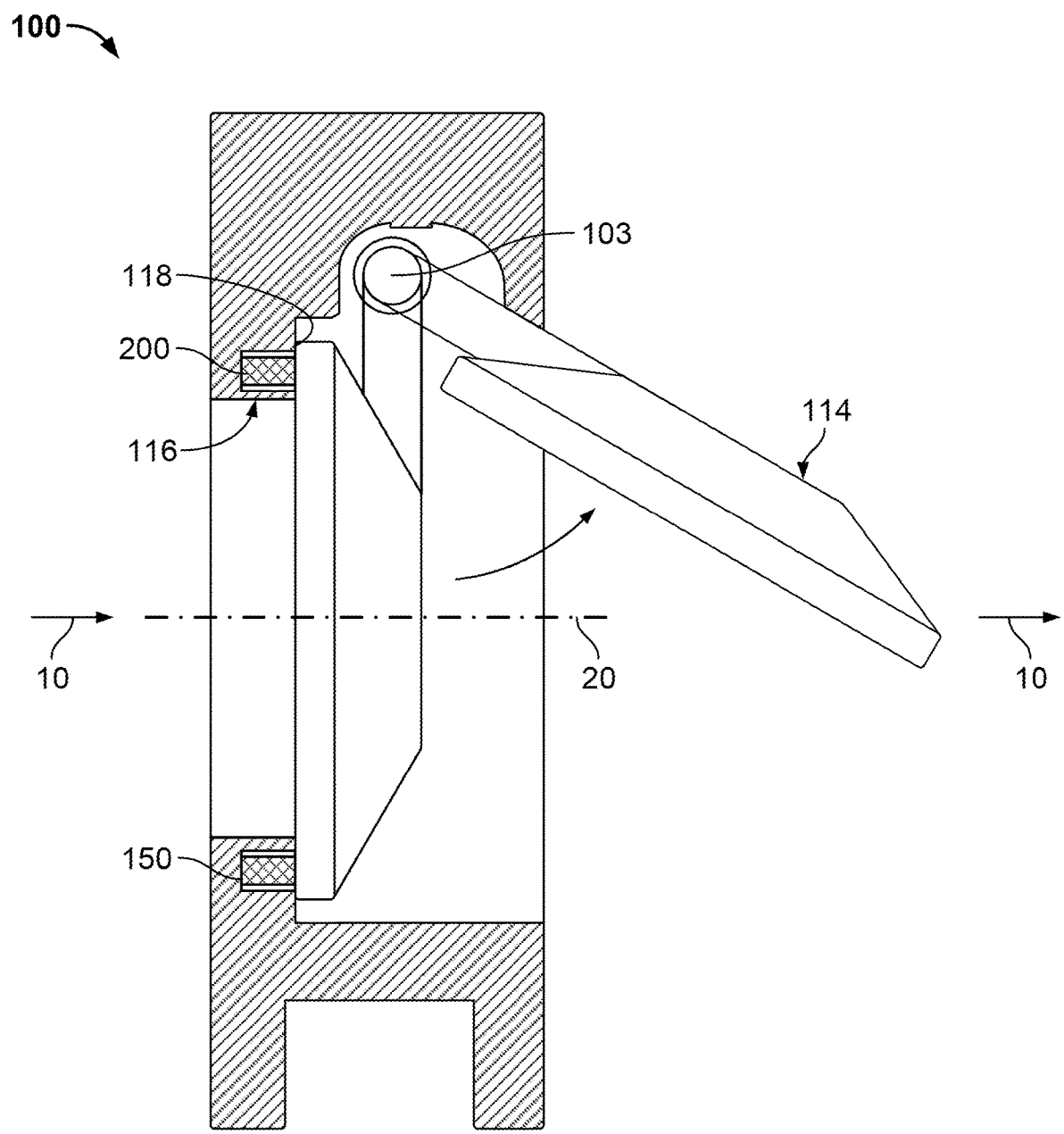
FIG. 2 is a cross-section view of a portion of an example implementation of a swing check valve that includes a dampening ring according to the present disclosure.

FIG. 2 is a cross-section of a portion of an example implementation of the swing check valve 100 that includes the dampening ring 200 according to the present disclosure. FIG. 2 shows a portion of the swing check valve 100 and specifically, the flapper 114 in both a closed position (in contact with the seat 116) and in an open position (rotated about the hinge 103 away from the seat 115). As shown in this example, rotation of the flapper 114 about the hinge 113 is in a plane parallel to a longitudinal axis 20 of the swing check valve 100. As further shown in this example, the dampening ring 200 is positioned in a circular groove 150 that is formed in the face 118 of the seat 116.

Figure 3A:
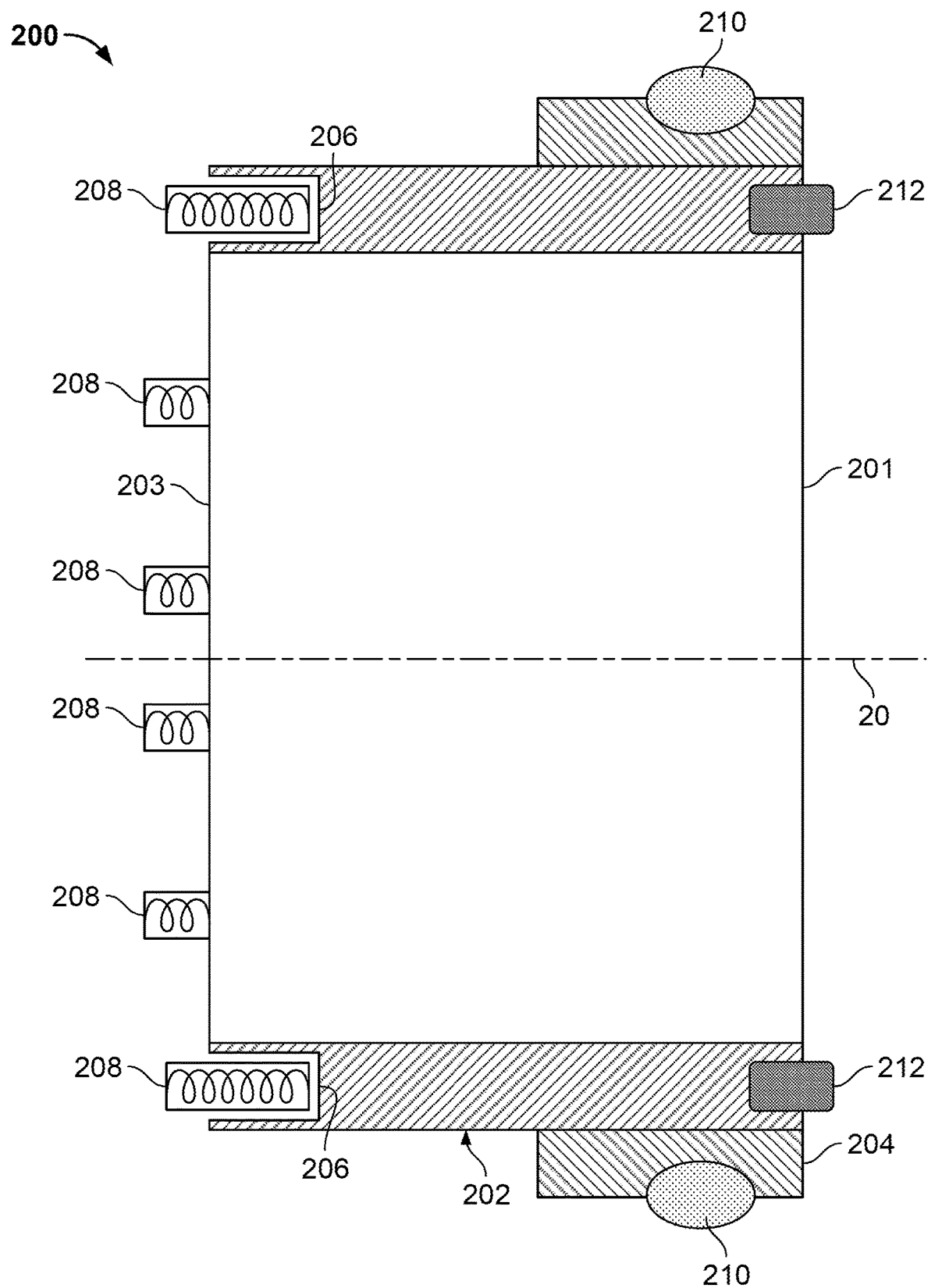
FIG. 3A is a schematic diagram of an example implementation of a dampening ring for a swing check valve according to the present disclosure.

FIG. 3A is a cross-section of an example implementation of the dampening ring 200 for a swing check valve according to the present disclosure. As shown in this figure, the cross-section is taken about the longitudinal axis 20 of the swing check valve 100 (which is not shown in this figure). In this example implementation, the dampening ring 200 includes a circular or ring-shaped body 202 (that at least partially fits into the groove 150 described herein). In some aspects, the body 202 can be formed from a metal material (for example, stainless steel, Inconel or some other metal) or a polymer material, such as polytetrafluoroethylene.

The body 202 extends between a first face 201 and a second face 203 (of the ring that forms the body 202). In this example implementation, an interface 212 is coupled to or at least partially embedded in the first face 201. The interface 212, when the dampening ring 200 is positioned in the groove 150 of the swing check valve 100, is or becomes a contact surface to receive the flapper 114 when the swing check valve 100 is in a closed position. In some aspects, the interface 212 (which can be a continuous ring or just portions of a continuous ring about the first face 201) is comprised of a sealing material. For example, when the optional interface 212 is mounted or formed in the body 202 as a metal material, the interface 212 can be formed of a composite or other material that is, for instance, softer than the material of the body 202. As an example, the interface 212 can be made of a polymer such as polytetrafluoroethylene.

As illustrated in this example, positioned or mounted to or at least partially within the second face 203 of the body 202 are biasing members 208. Biasing members 208 can be potential energy members, such as, for example, springs or Belleville washers. As springs, the biasing members 208 can be coil springs or helical compression springs as two of many examples. In this example implementation, each biasing member 208 is at least partially inserted or attached within a slot 206. Thus, as shown, the biasing members 208 are set into the slots 206 but also at least partially extend (in an uncompressed state) from the second face 203.

As further shown in the example implementation of FIG. 3A, a shoulder 204 is attached to or formed as part of the body 202 of the dampening ring 200. In this example, the shoulder 204 is formed near or flush with the first face 201 of the body 202. However, in alternative implementations (as further described herein), a shoulder can be formed closer to or flush with the second face 203 of the body 202.

In this example implementation, a seal 210 (such as a gasket or O-ring, which can be made of an elastomeric or flexible material) is coupled to or at least partially inset into the shoulder 204. In implementations of the dampening ring 200 that do not include a shoulder 204, the seal 210 can be coupled to or at least partially inset within the body 202 of the dampening ring 200. As explained in more detail herein, the seal 210, when the dampening ring 200 is positioned or secured into the groove 150, can prevent or reduce a flow of the secondary fluid flow 15 that leaks between the flapper 14 and the seat 16 from reaching the fluid inlet 106 of the swing check valve 100.

Figure 3B:
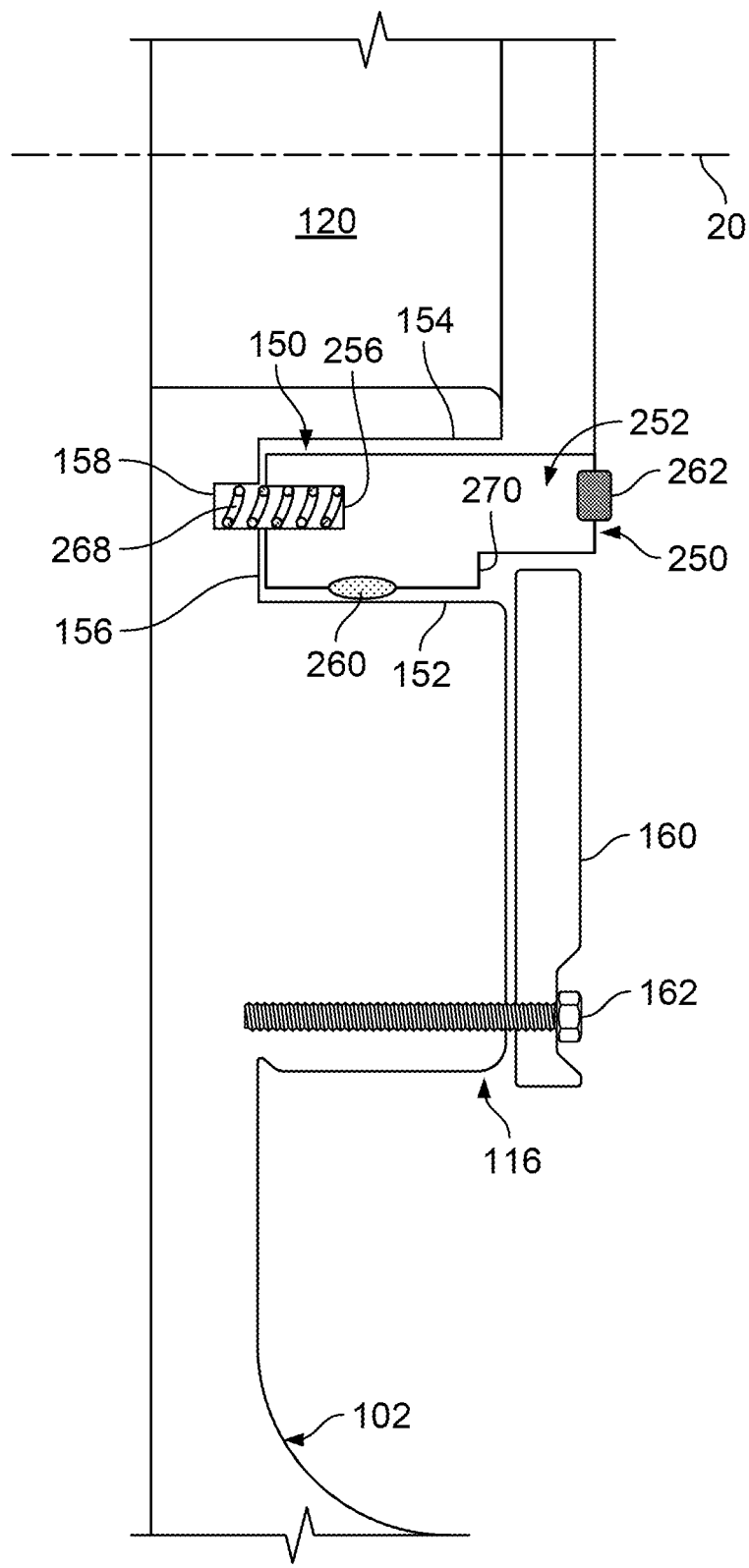
FIG. 3B is a schematic diagram of an example implementation of a dampening ring positioned in a swing check valve according to the present disclosure.

FIG. 3B is a cross section of an example implementation of the dampening ring positioned in a swing check valve according to the present disclosure. This figure shows a portion of the swing check valve 100 into which a dampening ring 250 is positioned and secured within the groove 150. Dampening ring 250 is similar to dampening ring 200 and includes a body 252 (similar to the body 202), multiple biasing members 268 (similar to biasing members 208) inset or secured within slots 256 (similar to slots 206), an interface ring 262 (similar to interface ring 212), and a seal 260 (similar to seal 210). Dampening ring 250, however, includes a shoulder 270 that is coupled to or integral with the body 252 and is positioned closer to the biasing members 268.

As shown, the dampening ring 250 is positioned within the groove 150, which is defined by an end wall 156, an inner side wall 154, and an outer side wall 152. The seal 260 is positioned in the body 252 (or shoulder 270) to be adjacent to the outer side wall 152.

In this example, the dampening ring 250 is secured within the groove 150 through the installation of a removable seat face 160 that is installed to the seat 116 with one or more fasteners 162. The seat face 160, in this example, comprises a ring-shaped members connected to the seat 116 in such a fashion to overhang the shoulder 270 as shown. Therefore, interference is created between the shoulder 270 and the seat face 160, maintaining the dampening ring 250 in the groove 150 during operation of the swing check valve 100.

Figure 4:
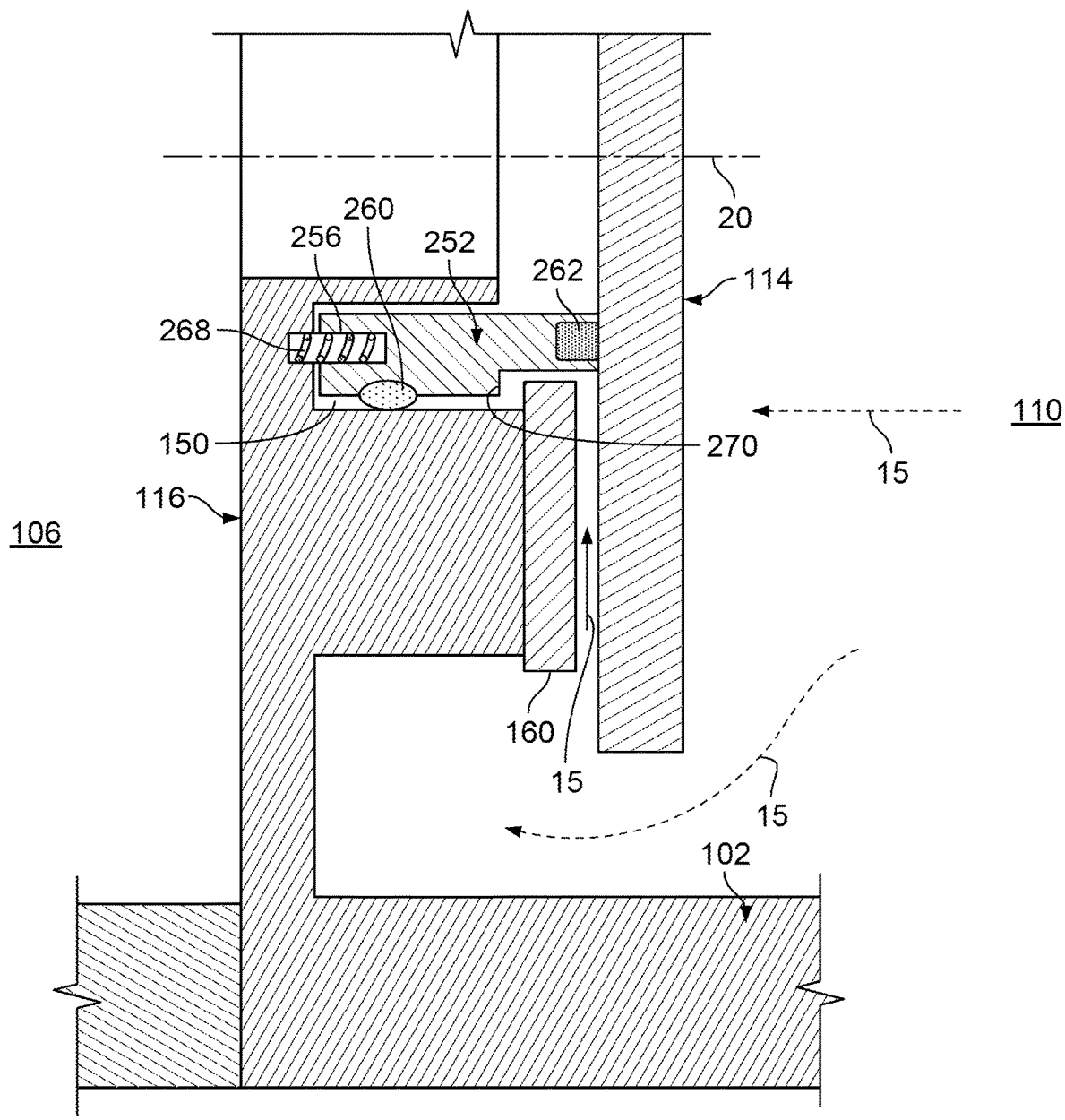
FIG. 4 is a schematic diagram of an example implementation of a dampening ring positioned in a swing check valve in a closed position according to the present disclosure.

FIG. 4 is a cross-section of an example implementation of a dampening ring positioned in a swing check valve in a closed position according to the present disclosure. FIG. 4 is a similar illustration as FIG. 3B and shows the dampening ring 250 positioned in the groove 150. This figure (in combination with FIGS. 5A-5C) illustrates the operation of the seal 260 when the secondary fluid flow 15 circulates from the fluid outlet 110 toward the fluid inlet 106 at a velocity and/or pressure which is sufficient to urge the flapper 114 toward the seat 116 but is not sufficient to urge the flapper 114 into a completely fluid-tight seal against the seat 116. Therefore, as shown in FIG. 4, the secondary fluid flow 15 can leak between the flapper 114 and the seat face 160 and also into a space between the body 252 of the dampening ring 250 and the outer side wall 152 of the groove 150. This can occur when the flapper 114 is not tightly held against the seat face 160 (and, as shown, the interface 262) by the velocity and/or pressure of the secondary fluid flow 15.

Figure 5A:
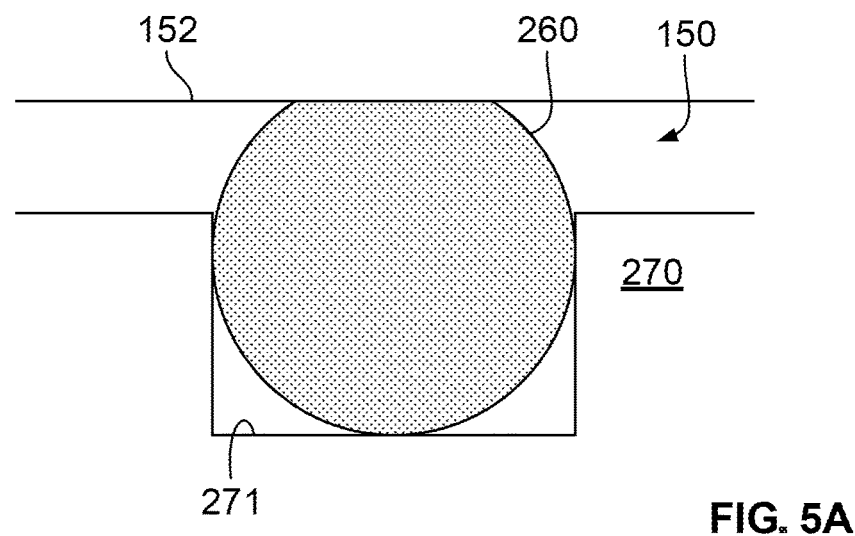
FIGS. 5A-5C are schematic illustrations of a seal of a dampening ring for a swing check valve under different fluid pressure conditions according to the present disclosure.
Figure 5B:
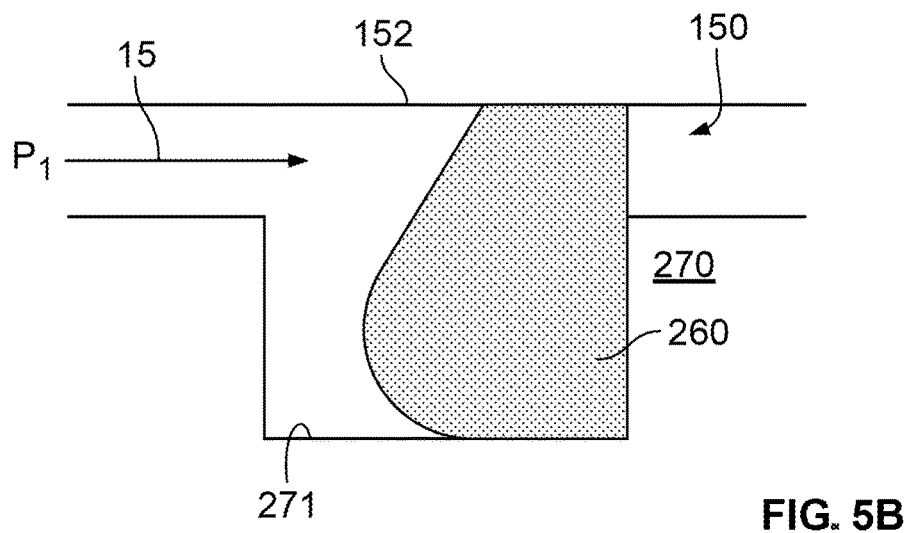
Figure 5C:
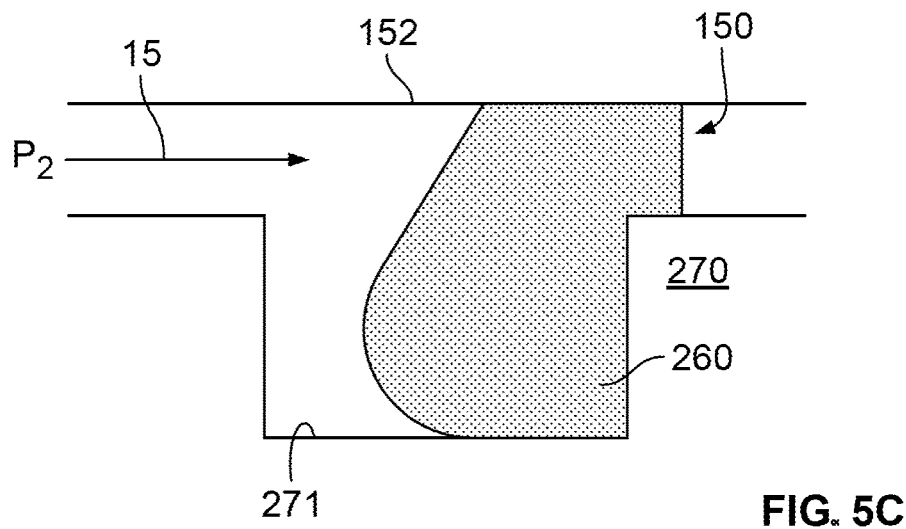

Turning to FIGS. 5A-5C, these figures show the operation of the seal 260 as different fluid pressures of the secondary fluid flow 15 are applied thereto. FIG. 5A, for example, shows the seal 260—in this example inset into the shoulder 270 in a groove 271—where there is negligible, or no, pressure on either side of the seal 260 that extends into a portion of the groove 150 that is between the shoulder 270 (or body 252) and the outer side wall 152. With no pressure, a natural resilience of the material of the seal 260 (such as an elastomeric material) can create fluid tight seal in this space between the dampening ring 250, generally, and the seat 116 to stop fluid from passing through.

FIG. 5B shows the seal 260 where there is a fluid pressure, $P_1$, acting on a side of the seal 260 in fluid communication with a gap in between the flapper 114 and the seat 116 (or the seat face 160). In this example, a value of $P_1$ is relatively low such that, in some aspects, the flapper 114 is not held tightly against the seat 116 (or seat face 160). Still, the seal 260 can deform as shown to keep a tight seal in the space between the dampening ring 250, generally, and the seat 116 to stop fluid from passing through.

FIG. 5C shows the seal 260 where there is a fluid pressure, $P_2$, acting on a side of the seal 260 in fluid communication with a gap in between the flapper 114 and the seat 116 (or the seat face 160). In this example, a value of $P_2$ is relatively high such that, in some aspects, the flapper 114 is held tightly against the seat 116 (or seat face 160) but the secondary fluid flow 15 still reaches the seal 260. The seal 260 can further deform as shown to keep a tight seal in the space between the dampening ring 250, generally, and the seat 116 to stop fluid from passing through. The seal 260, after having experienced a fluid pressure that causes deformation, can return to its original shape (for example, as shown in FIG. 5A) when that pressure is absent.

In an example operation of a swing check valve with a dampening ring according to the present disclosure, the primary fluid flow 10 can be circulated through the swing check valve 100. The velocity and/or pressure of the primary fluid flow 10 can cause the flapper 114 to unseat from the seat 116 and rotate about the hinge 103 to allow the primary fluid flow 10 from the fluid inlet 106, through the fluid flow path 120, and to the fluid outlet 110 of the swing check valve 100. In the case of reverse flow, where the secondary fluid flow 15 circulates from the fluid outlet 110 toward the fluid inlet 106, the velocity and/or pressure of the secondary fluid flow 15 can cause the flapper 114 to slam onto the seat 116.

As the flapper 114 contacts the seat 116, the dampening ring 200 or 250 can reduce a force that is transmitted from the secondary fluid flow 15, to the flapper 114, and to the seat 116, thereby minimizing damage to the seat 116 (and flapper 114) and extending a life of the swing check valve 100. For example, the biasing members 208 (or 268) can absorb some or all of the force or energy by compressing while in contact with the body 202 (or 252) and the seat 116, itself. As another example, the interface 212 or 262 (for example, as a polymer material softer than a material of the body 202 or 252), can absorb some or all of the force or energy when the flapper 114 comes into contact with the interface 212 or 262. This process can be repeated for each change of direction of flow of the fluid through the swing check valve 100.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A swing check valve, comprising:
    a valve body that defines a fluid flow path from a fluid inlet at a first end of the valve body to a fluid outlet at a second end of the valve body opposite the first end;
    a flapper coupled to the valve body and moveable between a first position to allow fluid flow in a primary flow direction from the fluid inlet to the fluid outlet through the fluid flow path and a second position to impede or prevent fluid flow in a secondary flow direction from the fluid outlet to the fluid inlet through the fluid flow path;
    a seat coupled to or integral with the valve body within the fluid flow path such that the flapper is apart from a face of the seat in the first position and abuts the face of the seat in the second position, the seat comprising a groove formed in the face; and
    a dampening ring positioned at least partially within the groove and comprising an interface aligned with the face of the seat such that the flapper abuts the interface in the second position, the dampening ring comprising:
        a body formed as a ring and comprising the interface; and
        a flexible seal positioned on or at least partially within the body and adjacent an outer radial side wall of the groove and configured to deform at least partially into a space between the body and the outer radial side wall of the groove based on a pressure of the fluid flow in the secondary flow direction between the face of the seat and the body and between the body and the outer radial side wall.

2. The swing check valve of claim 1, wherein the dampening ring comprises:
    a plurality of biasing members circumferentially positioned about and at least partially within the body and adjacent an end wall of the groove.

3. The swing check valve of claim 2, wherein the plurality of biasing members are a plurality of coil springs, a plurality of helical compression springs, or a plurality of Belleville washers.

4. The swing check valve of claim 3, wherein the body of the dampening ring comprises a shoulder that faces away from the plurality of biasing members, and the face of the seat comprises a removable face secured to the valve body adjacent the shoulder to at least partially secure the dampening ring within the groove.

5. The swing check valve of claim 2, wherein the interface comprises a ring of polymer positioned on or at least partially within the body opposite the plurality of biasing members.

6. The swing check valve of claim 5, wherein the polymer ring comprises polytetrafluoroethylene.

7. The swing check valve of claim 2, wherein the body is formed of a polymer, and the interface comprises an end face of the body opposite the plurality of biasing members.

8. The swing check valve of claim 2, wherein the body of the dampening ring comprises a shoulder that faces away from the plurality of biasing members.

9. The swing check valve of claim 8, wherein the face of the seat comprises a removable face secured to the valve body adjacent the shoulder to at least partially secure the dampening ring within the groove.

10. The swing check valve of claim 2, wherein the groove comprises a plurality of slots formed in the end wall of the groove, each slot sized to receive at least a portion of one of the plurality of biasing members.

11. A method of operating a swing check valve, comprising:
    flowing a fluid to a fluid inlet of a valve body of a swing check valve;
    flowing the fluid through a fluid flow path of the valve body by moving, with the flow of the fluid, a flapper coupled to the valve body away from a face of a seat coupled to or integral with the valve body, the seat comprising a groove formed in the face, the swing check valve comprising a dampening ring positioned in the groove and comprising an interface;
    flowing the fluid to a fluid outlet of the valve body opposite the fluid inlet;
    receiving a flow of the fluid from the fluid outlet toward the fluid inlet;
    based on the flow of the fluid from the fluid outlet toward the fluid inlet, moving the flapper to abut the face of the seat and the interface to impede or prevent the flow of the fluid through the fluid flow path to the fluid inlet;
    absorbing at least a portion of energy generated when the flapper abuts the interface, through a body of the dampening ring; and
    blocking a portion of the flow of the fluid from the fluid outlet toward the fluid inlet that circulates within a space between the body and an outer radial side wall of the groove with a flexible seal positioned on or at least partially within the body and configured to deform into a space between the face of the seat and the body and between the body and the outer radial side wall.

12. The method of claim 11, wherein absorbing at least a portion of energy generated when the flapper abuts the interface, through the body of the dampening ring, comprises absorbing at least the portion of the energy with a plurality of biasing members circumferentially positioned about and at least partially within the body and adjacent an end wall of the groove.

13. The method of claim 12, wherein the plurality of biasing members are a plurality of coil springs, a plurality of helical compression springs, or a plurality of Belleville washers.

14. The method of claim 13, wherein the body of the dampening ring comprises a shoulder that faces away from the plurality of biasing members, and the dampening ring is at least partially secured within the groove with a removable portion of the face that is secured to the valve body adjacent the shoulder.

15. The method of claim 12, comprising absorbing the portion of energy generated when the flapper abuts the interface with the interface that comprises a ring of polymer positioned on or at least partially within the body opposite the plurality of biasing members.

16. The method of claim 15, wherein the polymer ring comprises polytetrafluoroethylene.

17. The method of claim 12, comprising absorbing the portion of energy generated when the flapper abuts the interface that comprises an end face of the body opposite the plurality of biasing members.

18. The method of claim 17, wherein the body is formed of a polymer.

19. The method of claim 12, wherein the body of the dampening ring comprises a shoulder that faces away from the plurality of biasing members.

20. The method of claim 19, wherein the dampening ring is at least partially secured within the groove with a removable portion of the face that is secured to the valve body adjacent the shoulder.

21. The method of claim 12, comprising absorbing at least a portion of energy generated when the flapper abuts the interface, through the plurality of biasing members, with each biasing member at least partially extending from the dampening ring into a respective slot formed in the end wall of the groove.

22. The method of claim 11, comprising at least partially deforming the seal into the space between the body and the side wall of the groove based on a pressure of the portion of the flow of the fluid from the fluid outlet toward the fluid inlet.

* * * * *